(12) United States Patent
Sofianos

(10) Patent No.: US 8,290,852 B2
(45) Date of Patent: *Oct. 16, 2012

(54) MODEL-BASED SELECTION OF TRADE EXECUTION STRATEGIES

(75) Inventor: Georghios A. Sofianos, Brooklyn, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,658

(22) Filed: May 31, 2011

(65) Prior Publication Data

US 2012/0150712 A1    Jun. 14, 2012

Related U.S. Application Data

(63) Continuation of application No. 11/290,973, filed on Nov. 30, 2005, now Pat. No. 7,974,911.

(51) Int. Cl.
*G06Q 40/00* (2012.01)
(52) U.S. Cl. ............................................ 705/37; 702/35
(58) Field of Classification Search ................. 705/37
See application file for complete search history.

(56) References Cited

U.S. PATENT DOCUMENTS

| | | | | |
|---|---|---|---|---|
| 2002/0069135 A1* | 6/2002 | Kondo et al. | ................... | 705/26 |
| 2003/0009411 A1* | 1/2003 | Ram et al. | ...................... | 705/37 |

OTHER PUBLICATIONS

Bossearts, Peter & Platt, Charles. The CAPM in thin experimental financial markets. Journal of Economic Dynamics & Control. Amsterdam: Jul. 2002. vol. 26, Iss. 7,8; p. 1093.

Eugene Fink, Josh Johnson, & Jenny Hu. (2004). Exchange Market for Complex Goods: Theory and Experiments. Netnomics: Economic Research and Electronic Networking, 6(1), 21-42. Retrieved Nov. 5, 2010, from AABI/INFORM Global (Document ID: 621013601).

Liao, Qinyu (2005). Empirical findings on persuasiveness of recommender systems for customer decision support in electronic commerce. Ph.D. dissertation, Mississippi State University, United States—Mississippi. Retrieved Nov. 5, 2010, from Dissertations & Theses: Full Text.(Publication No. AAT 3221502).

Sofianos, George et al., "Street Smart", Goldman Sachs, Trading & Market Structure Analysis, Issue 22, Feb. 22, 2005, 4 pages.

* cited by examiner

*Primary Examiner* — Muriel Tinkler
(74) *Attorney, Agent, or Firm* — Perkins Coie LLP

(57) ABSTRACT

Effective selection of trade execution strategies using a multi-dimensional model is disclosed. A relationship exists between order difficulty and execution strategy. Execution strategy depends on order difficulty, and order difficulty has many dimensions. The multi-dimensional model classifies trade orders according to the dimensions, and then maps these classified trade orders into suitable execution strategies. For each trade order, one or more appropriate strategies are automatically selected and presented to the trader to assist the trader in making an informed and timely decision.

20 Claims, 6 Drawing Sheets

MODEL-BASED SELECTION OF TRADE EXECUTION STRATEGIES

RELATED APPLICATION AND PRIORITY CLAIM

This application is a continuation of and claims priority under 35 U.S.C. §120 to U.S. patent application Ser. No. 11/290,973 entitled "Model-Based Selection of Trade Execution Strategies" filed on Nov. 30, 2005 now U.S. Pat. No. 7,974,911. The entire contents of the aforementioned application are hereby incorporated by reference.

TECHNICAL FIELD

This disclosure relates to trading, and particularly to selection of trade execution strategies.

BACKGROUND

Financial markets depend on efficient execution of trades to buy and sell equities. Historically, human traders executed the trade with one trader representing the seller (the "sell-side trader") and a second trader representing the buyer (the "buy-side trader"). As trading volume increased, more trading was performed automatically by computerized systems, such as the NASDAQ marketplace and ECNs (Electronic Communications Networks). The types of trades have also grown more complex. Today, there are many different types of trades of varying levels of complexity, and equally many diverse trading strategies to execute these trades.

One of the challenges encountered by a buy-side trader is how to choose the right execution strategy from a large number of possible execution strategies. Consider a simple order to buy 2,000 shares of fictitious large-cap XYZ Corp. The trade order is presented on the trader's screen and the trader is immediately faced with many decisions. Should this trade be executed over 30 minutes or 3 days? Should the trader use market orders or limit orders? Does the trader execute the trade as part of a portfolio trade or as a single stock trade? Should the trader use a traditional broker-dealer or direct market access (DMA)? The trader must make many snap decisions, select an execution strategy based on these decisions, and then allow the system to complete the trade.

Efficient trade execution thereby requires timely selection and application of the most suitable execution strategy for a particular trade. This is not so simple. Indeed, the problem of choosing an optimum execution strategy gets very complicated, very quickly. In a rapid trading environment, the trader commonly sees a large volume of trades flash across the screen. The trader is forced to make execution decisions in a very short timeframe. Further, each execution decision has a real cost associated with it. For instance, if the trade order is difficult, there is a preference for a "high touch" strategy that involves a human trader. The human trader charges a higher premium for executing the trade. Conversely, if the trade order is not overly complex, a "low touch" strategy that calls for computerized execution of the trade might be preferred. The cost to execute a trade electronically is generally significantly lower (sometimes orders of magnitude lower) than that involving the human trader.

Accordingly, there is a need for improved techniques to assist traders in making timely decisions to identify appropriate execution strategies that minimize the costs of executing the trade.

SUMMARY

Effective selection of trade execution strategies using a multi-dimensional model is disclosed. A relationship exists between order difficulty and execution strategy. Execution strategy depends on order difficulty, and order difficulty has many dimensions. The multi-dimensional model classifies trade orders according to the dimensions, and then maps these classified trade orders into suitable execution strategies. For each trade order, one or more appropriate strategies are automatically selected and presented to the trader to assist the trader in making an informed and timely decision.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to computerized selection of execution strategies for various types of trades. A framework is presented for mapping trade orders into execution strategies according to order difficulty. Order difficulty has many factors or dimensions. The framework can thus be conceptualized as a multi-dimensional model, where each dimension represents a different measure of order difficulty. In its simplest form, the model can be represented as a cube with three dimensions of order difficulty. For equity trading, one possible set of dimensions are liquidity, order size, and trade urgency.

Trade orders are classified within the model according to the three dimensions of order difficulty. Assuming the three dimensions of liquidity, order size, and trade urgency, the easiest orders represented by the cube are low-urgency, small orders in large-cap stocks. In contrast, the most difficult orders are high-urgency, large orders in small-cap stocks. Once defined, the multi-dimensional model is mapped into execution strategies that are suitable for executing the trade orders. In this manner, trade orders are initially assessed and classified by the model and then mapped to the appropriate execution strategies. The execution strategies are presented to the trader, thereby providing a practical decision-making tool.

For discussion purposes, the framework will be described in the context of a trading system used to trade equities in publicly traded companies. However, the framework may be used to identify trade execution strategies for other types of financial instruments, such as bonds, currency, debt, derivatives, and the like.

Architecture

Figure 1:
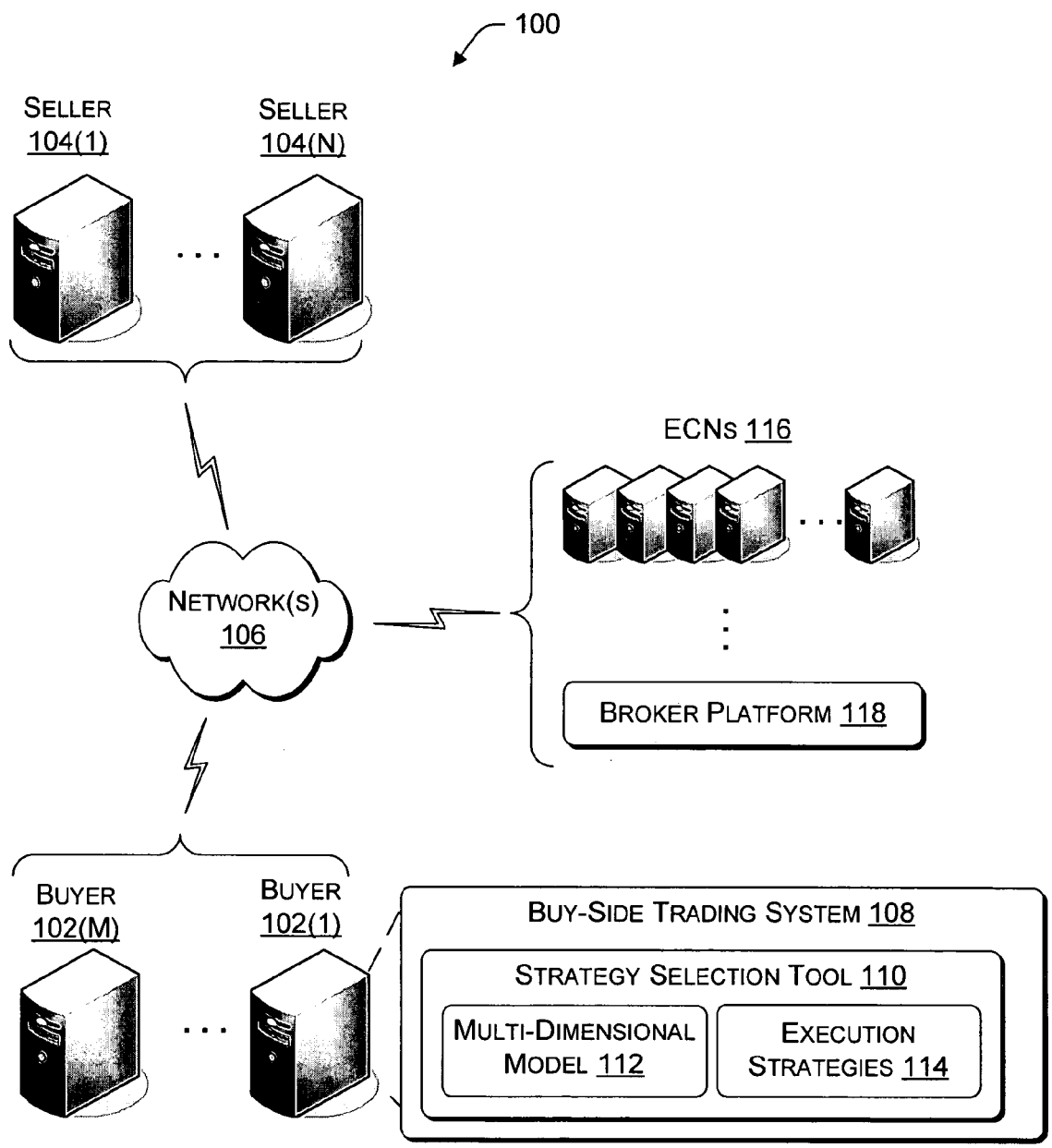
FIG. 1 illustrates an exemplary trading architecture in which multiple buyers exchange financial instruments with multiple sellers as part of a marketplace. Within this architecture, buy-side traders employ a model-based selection tool for selecting trade execution strategies.

FIG. 1 illustrates an architecture 100 that represents an exemplary trading environment in which multiple buyers 102(1), ..., 102(M) exchange equities (or other financial instruments) with multiple sellers 104(1), ..., 104(N) as part of a marketplace. The buyers and sellers may be individuals, corporations, or other trading entities. The buyers 102 and sellers 104 use computerized systems to electronically place orders to buy and sell equities. Server computers are illustrated, but other types of computerized systems may be employed. The buyer and seller computers are coupled to communicate over one or more networks 106, which is representative of any number or combination of different networks, including proprietary data networks, the Internet, wireless networks, satellite networks, and the like.

Each buyer 102 implements a buy-side trading system 108, which is diagrammatically represented as being implemented on a networked server computer, although other arrangements and configurations are possible. The trading system 108 supports a strategy selection tool 110 that receives trade orders placed by the sellers 104 and assists the buy-side trader in timely selecting suitable trade execution strategies for executing the trade orders.

Selection of execution strategies is based on a multi-dimensional model 112, which contemplates multiple dimensions of order difficulty. The strategy selection tool 110 evaluates the trade orders according to the model 112 and timely presents recommended execution strategies to traders to assist them in making optimal decisions in a relatively short timeframe.

For any given trade order, there may be one or many different execution strategies. The strategy selection tool 110 maintains a library of possible execution strategies 114. Such strategies might include, for example:
- Single stock trading or portfolio trading
- Broker-dealer for capital or agency executions
- Direct Market Access (DMA) to Electronic Communication Networks (ECNs)
- Direct Market Access (DMA) to Crossing networks
- Traditional floor-based exchanges
- Broker platforms (e.g., REDIPlus™ from Goldman Sachs & Co.)
- Algorithmic trading Once a strategy is identified and selected, the trading system 108 directs execution of the trade orders according to the chosen execution strategy. This may involve routing the orders to an appropriate entity to execute the trade. Example entities shown in FIG. 1 include ECNs 116 and broker platforms 118, although there are many other types of entities.

One example implementation of the trading system 108 and strategy selection tool 110 is described below in more detail with reference to FIG. 4. Prior to this description, however, is an explanation of one example multi-dimensional model used to select appropriate trade execution strategies.

Multi-Dimensional Model

The strategy selection tool 110 uses the multi-dimensional model 112 to map trade orders into execution strategies. This mapping is based upon order difficulty, which has many dimensions. The multi-dimensional model 112 has at least three dimensions. Hence, in its simplest form, the model 112 can be represented geometrically as a cube.

Figure 2:
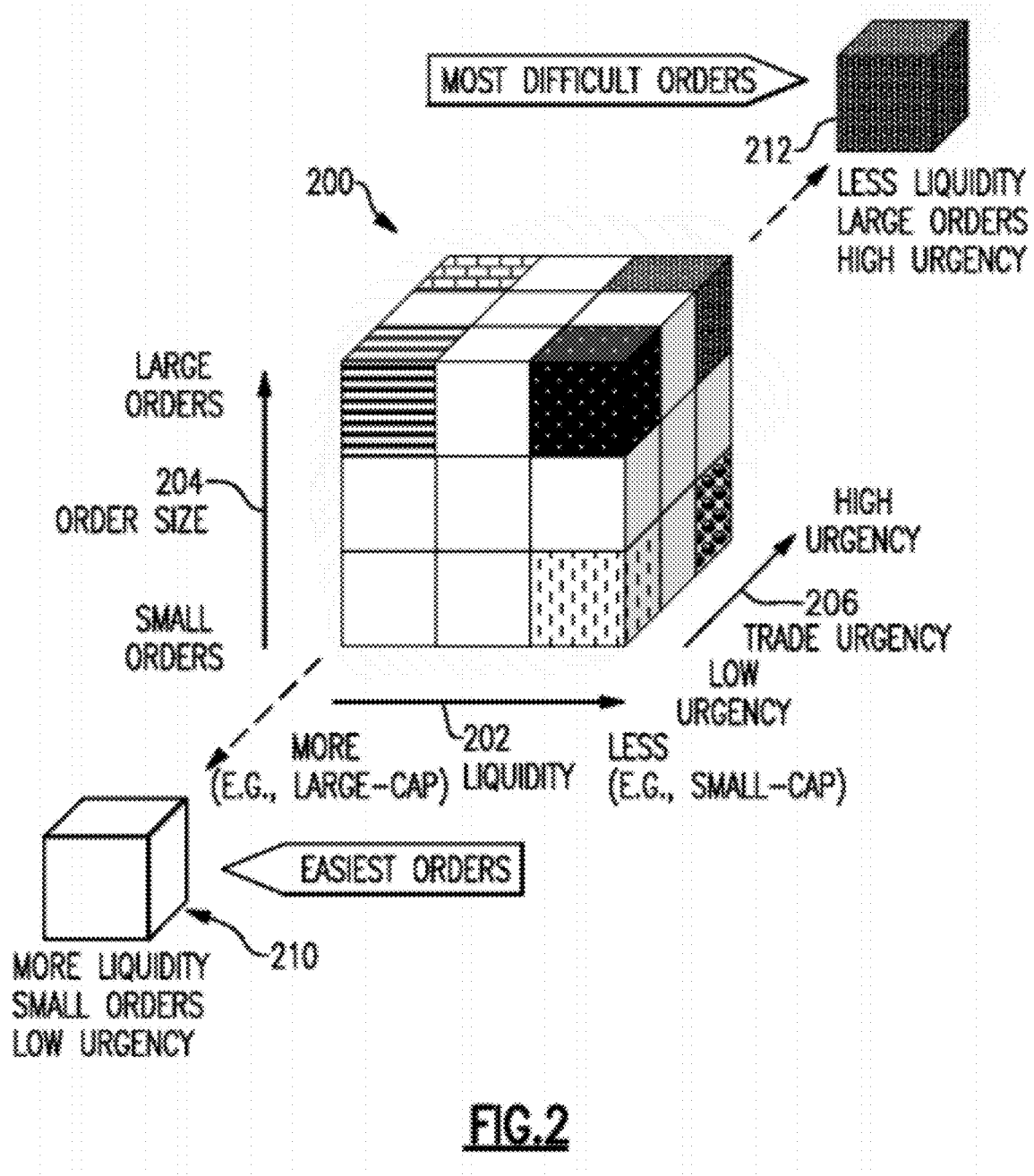
FIG. 2 illustrates one implementation of a multi-dimensional model, which is graphically represented as a three-dimensional cube.

FIG. 2 shows the multi-dimensional model 112 graphically represented as a three-dimensional cube 200. Cube 200 represents three dimensions of order difficulty that influence a choice of execution strategies. In one implementation, the three dimensions of order difficulty are stock liquidity, order size, and trade urgency. In other implementations, different sets of dimensions may be used. The three dimensions correspond to the three axes of the cube 200. Each dimension has one or more quantifiable components that can be used to measure or otherwise quantify the corresponding dimension.

Stock liquidity is one dimension of order difficulty. Generally, trade orders for stocks with more liquidity are easier to execute than orders for stocks with less liquidity. A stock liquidity dimension 202 is represented along an x-axis of the cube 200 and ranges from more liquidity to less liquidity. The stock liquidity dimension 202 can be quantified by one or more quantifiable components that affect liquidity. One example liquidity component is market capitalization, where publicly traded companies with a large market capitalization ("large-cap stocks") stocks, tend to be more liquid than publicly traded companies with a small market capitalization ("small-cap stocks"). Using market capitalization as a measure, for example, the stock liquidity dimension 202 would be quantified according to a dollar amount reflected in the market capitalization, scaling from large-cap stocks (e.g., $10 billion or more) to small-cap stocks (e.g., less than $1 billion). The execution strategy for orders in large-cap stocks is different than for orders in small-cap stocks.

Another quantifiable component that may be used to measure the liquidity dimension 202 is the market exchange in which the equity is traded. Stocks traded on larger exchanges (e.g., NYSE, NASDAQ, London, Tokyo, etc.) tend to be more liquid than, say, regional over-the-counter (OTCs) exchanges that handle smaller or "penny" stocks. Timing is yet another component of the liquidity dimension 202. For example, stocks tend to be less liquid just prior to quarterly earnings news and more liquid following earning announcements. Irregular announcements or news items may also be considered a component of the liquidity dimension, as stocks tend to be more liquid following such events. These components are examples, and the skilled artisan will appreciate that there may be many other components that affect the liquidity dimension 202.

Order size is another dimension of order difficulty that is used in the cube 200. Generally, trade orders for larger numbers of shares are more difficult to execute than orders for smaller numbers of shares (unless, perhaps, the number is very small). For instance, the strategy for an order to trade one percent of a stock's average daily volume (ADV) is different from the strategy for an order to trade 50 percent of ADV. An order size dimension 204 is represented along a y-axis of the cube 200, ranging from small orders to large orders.

The order size dimension 204 can be quantified by one or more components. One example size component is the number of shares, which may be expressed in raw numbers of shares being traded or as a percentage of some metric (e.g., percentage of outstanding shares, percentage of ADV, etc.). Another component that might affect order size is market capitalization, as an order to trade a particular number of shares is often easier to accommodate for large-cap stocks than for small-cap stocks. Other components that might affect order size include sector type and market (e.g., NYSE, NASDAQ, OTC, etc.).

A third dimension of order difficulty in cube 200 is trade urgency. The execution strategy for a trade with a two-day horizon differs, for example, from the strategy for a trade with a two-hour horizon. A trade urgency dimension 206 is represented along a z-axis of the cube 200, ranging from low trade urgency to high trade urgency.

The trade urgency dimension may be measured in a number of ways. One way to quantify trade urgency is trading alpha, which is a measure of the likely price change over the trader's execution horizon, aside from the liquidity impact of the execution itself. Trading alpha is distinguished from a portfolio manager's (PM) alpha, which is a measure of what a buy-side manager expects to make over a longer term horizon. Thus, while the portfolio manager's strategic investment horizon may be months or years, a trader's tactical execution horizon ranges from a few hours to a few days. Trading alpha depends on the alpha of the underlying investment strategy, as well as the trading of other market participants. Passive investment strategies, for example, with no long-term PM alpha, may still have a positive trading alpha. For instance, passive funds, such as index funds, have little or no PM alpha, but still may exhibit high trading alphas at times. When the S&P 500 is periodically updated to allocate the correct company weightings and potentially add/remove companies, funds that track this index want to readjust rapidly the stocks in their portfolios. This results in a high trading alpha for a period of time.

Another component affecting the trade urgency dimension 206 is volatility. Stock volatility is measured in terms of the number of shares traded each day as compared to historical averages, such as ADV. Stocks exhibiting high volatility tend to have higher trade urgency than stocks with low volatility.

Execution risk is another factor influencing trade urgency. Execution risk results from random price changes where the price is equally likely to move up or down, and the longer a trader takes to execute an order the more the execution risk. Over many executions these random price changes average to zero. Because of the correlation between time to execution and execution risk, however, traders that dislike risk have higher urgency to trade, especially in volatile stocks.

Beta might be considered yet another component of the trade urgency dimension 206. Beta is the measure of individual stock price movement relative to the overall movement of the market. Stocks with a beta of one ($\beta=1$) move inline with the market. A beta of more than one ($\beta>1$) indicates that the stock generally experiences higher price movement in comparison to the market, and a beta of less than one ($\beta<1$) indicates that the stock generally experiences less price movement in comparison to the market. Thus, stocks with a beta greater than one ($\beta>1$) tend to have higher trade urgency than stocks with beta of less than one.

Using the cube 200, trade orders may be classified according to the three dimensions of order difficulty. The cube 200 may define a continuous scale along which to classify trade orders, or alternatively define discrete categories having pre-defined thresholds that are used to characterize the various trade orders. In the illustrated implementation, each dimension is divided into three categories (i.e., there are two classification thresholds for each dimension) resulting in 27 distinct blocks. Thus, the liquidity dimension 202 defines three categories including more liquidity, average liquidity, and less liquidity; the order size dimension 204 defines three categories including small orders, medium-sized orders, and large orders; and the trade urgency dimension 206 defines three categories including low urgency, medium urgency, and high urgency. It is noted that, in other implementations, the cube 200 may define more or less than 27 blocks. Further, as noted above, the cube may not define any discrete blocks at all, but simply rely on a continuously variable scale.

For ease of continuing discussion, suppose that the model is implemented to handle trade orders that resolve into one of the eight corner blocks of the cube 200. These corner clocks represent extremes of the various dimensions. This simplification ignores intermediate orders (e.g., mid-size in mid-cap stocks) as these orders can be difficult to finesse into the right execution strategy and the cost of not using exactly the right strategy is small in comparison to the extreme orders. With respect to the eight corner blocks, the easiest orders in the cube 200 are the low-urgency, small orders in highly liquid stocks, as represented by a corner block 210. In contrast, the most difficult orders are the high-urgency, large orders in less liquid stocks, as represented by a corner block 212.

To position trade orders in the cube 200, the trade orders are quantified along the three dimensions according to one or more components influencing each of the dimensions. Thresholds are set for the components to define the classification categories. Consider one example set of classification thresholds. To quantify the liquidity dimension 202, a stock's market capitalization is used to classify orders such that orders in stocks with a market capitalization greater than $10 billion are deemed to have high liquidity and orders in stocks with a market capitalization of less than $1 billion are deemed to have low liquidity. To quantify the order size dimension 204, one possible classification of orders is to deem orders of less than 0.25 percent of ADV as small orders and orders of more than 15 percent of ADV as large orders.

To quantify the trade urgency dimension 206, trading alpha ranges for different investment strategies can be ascertained using data from past executions and input from portfolio managers. As one example, trading alpha ranges for a predetermined time horizon can be defined, such as a trading alpha range from 0 to 80 basis points (bps) over a five-day horizon. Traders with low trading alphas have low urgency to trade, while traders with high trading alphas have high urgency to trade. One possible way to classify orders along the trade urgency dimension 206 is to construe orders with a trading alpha of less than 10 bps as low urgency and orders with a trading alpha of more than 50 bps as high urgency.

Table 1 summarizes the example set of classification thresholds for the cube 200.

TABLE 1

Example Set Classification Thresholds for Cube 200

| MODEL DIMENSION | CLASSIFICATION THRESHOLD |
| --- | --- |
| Liquidity Dimension | Low liquidity <$1 billion capitalization<br>High liquidity: >$10 billion capitalization |
| Order Size Dimension | Small Order size: <0.25% ADV<br>Large Order size: >15% ADV |
| Trade Urgency | Low Urgency: <10 bps<br>High urgency: >50 bps |

Given this example set of classifications, the easiest orders to handle (i.e., corner block 210) are in stocks with a market capitalization of more than $10 billion, for an order size of less than 0.25 percent of ADV, and with a trading alpha of less than 10 bps. In contrast, the most difficult orders to accommodate (i.e., corner block 212) are in stocks with a market capitalization of less than $1 billion, for an order size of more than 15 percent of ADV, and with a trading alpha of more than 50 bps.

Mapping Model to Execution Strategies

Now that a set of classification values is established for the dimensions, the various discrete blocks of the cube 200 are mapped to execution strategies. This converts the cube 200 into a decision making tool, in which trade orders are fitted to locations in the cube 200 and execution strategies mapped to these locations are selected for executing the trade orders.

Figure 3:
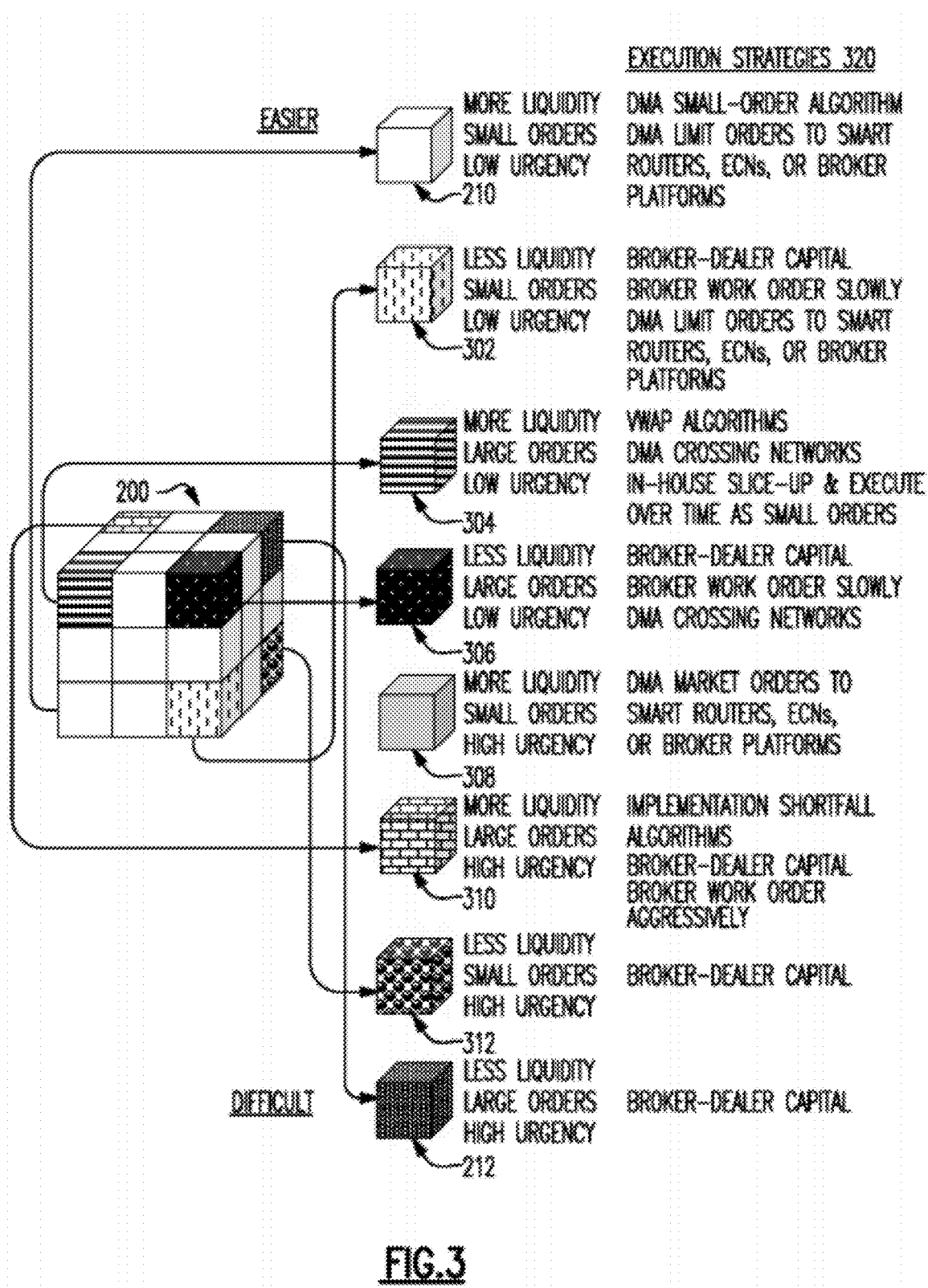
FIG. 3 is a diagram showing one possible mapping of trade order categories defined by the cube of FIG. 2 into execution strategies.

FIG. 3 shows one possible mapping of trade orders into execution strategies using the cube model 200. The various blocks of the cube 200 represent varying degrees of order difficulty. For ease of discussion, FIG. 3 illustrates the eight corner blocks arranged vertically according to order difficulty, with the top block 210 representing the easiest trade order to execute and the bottom block 212 representing the most difficult trade order to execute. Between these two blocks are six intermediate blocks 302-312 ranging from easier to more difficult.

Each category of trade order represented by the block is mapped to an associated execution strategy. Example execution strategies 320 are listed in conjunction with each block of the cube 200. For instance, for low urgency, small orders of more liquid stock (e.g., large-cap equities) (block 210), possible strategies include (1) DMA small-order algorithms, or (2) DMA limit orders to smart routers, ECNs, or broker platforms. For low urgency, large orders for more liquid stocks (block 304), possible strategies include (1) VWAP (volume-weighted average price) algorithms and (2) DMA crossing networks, and (3) in-house segmentation of the order into multiple smaller orders and execution of these smaller orders over time. For high-urgency, small orders in more liquid stocks (block 308), a possible strategy is DMA market orders to smart-routers, ECNs, or broker platforms.

Moving from easy to difficult orders, there are fewer choices and broker-dealer capital becomes more important. For high-urgency, large orders for more liquid stocks (block 310), possible execution strategies include (1) shortfall algorithms, (2) broker-dealer capital, and (3) broker work order aggressively. For high-urgency, small or large orders in less liquid stocks (bottom two blocks 312 and 212), the option is simply broker-dealer capital.

Deciding what strategies to associate with the various regions of the cube 200 can be based on many factors. One factor is transaction cost. The tool designer may wish to map types of trade orders represented in the cube 200 to execution strategies that result in the lowest transaction costs. Another factor may be timing. In this case, the tool designer may wish to map types of trade orders represented in the cube 200 to execution strategies that process the trade orders the fastest. Another factor may be the expected spectrum of trade order types and the resources available to process the different types. Thus, the tool designer may map the trade types to various strategies that result in an even distribution across the strategies to avoid any processing bottlenecks.

Additionally, the tool may employ more than one set of mappings and dynamically shift among the mappings to use different strategies. For example, the tool may implement a first mapping designed to minimize transaction costs during the trading day, and then shift to a second mapping that seeks to process the trades as fast as possible as the trading day draws to a close.

Strategy Selection Tool

Figure 4:
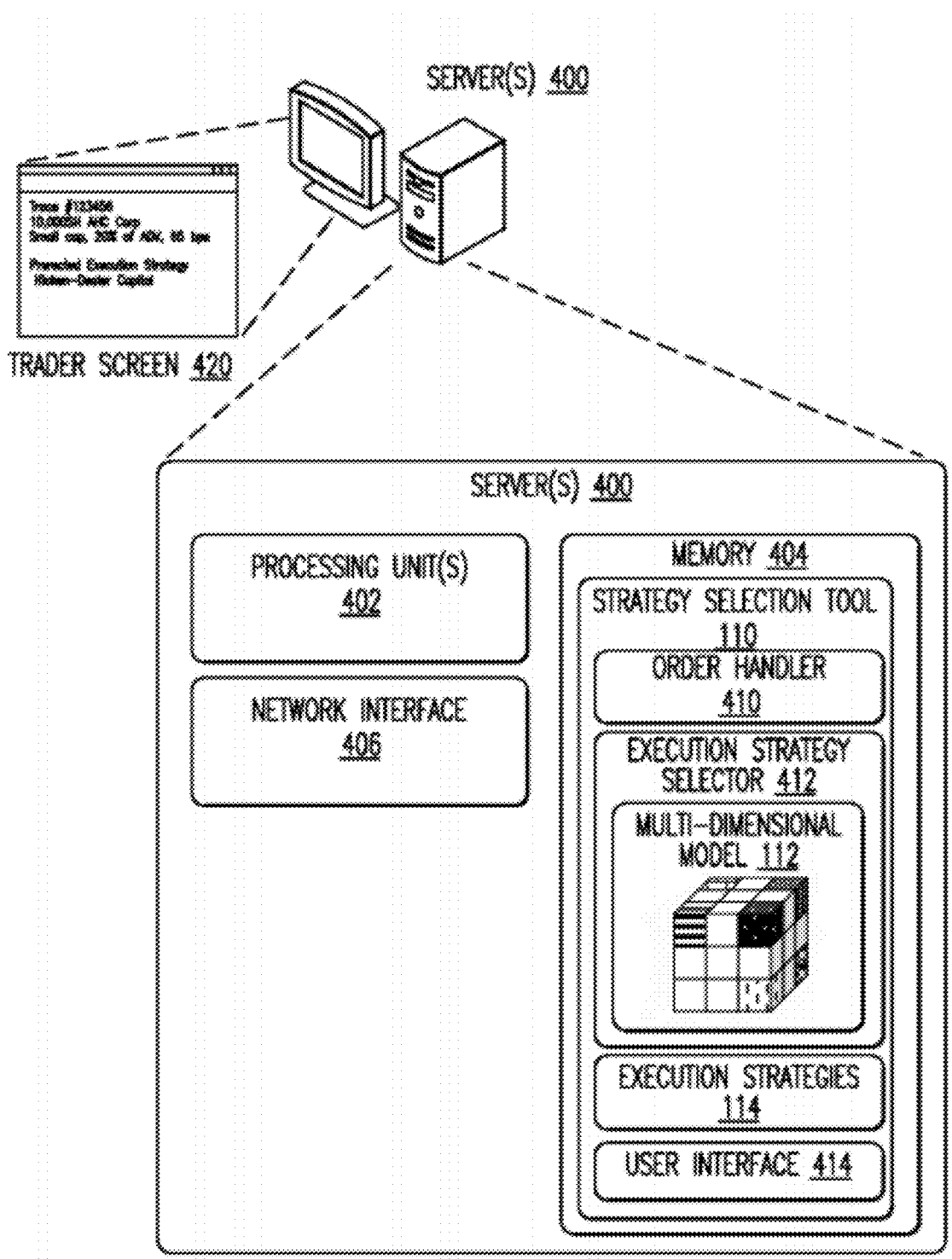
FIG. 4 is a functional block diagram of a buy-side trading system that runs a strategy selection tool that automates selection of trade execution strategies using the multi-dimensional model.

FIG. 4 shows one example implementation of the strategy selection tool 110, where the tool is configured as software executing on one or more servers 400, such as those that support the trading system 108 (FIG. 1). The server(s) 400 is equipped with one or more processing units 402 and memory 404 (e.g., volatile, non-volatile, and persistent memory). A network interface 406 is also provided to facilitate access to and communication over a network, such as network 106 (FIG. 1).

The strategy selection tool 110 is shown stored in memory 404 and executes on the processing unit(s) 402 to evaluate trade orders and map them to preferred execution strategies. The strategy selection tool 110 may include a number of components or modules. In this implementation, the strategy selection tool 110 has an order handler 410, an execution strategy selector 412, a library of execution strategies 114, and a user interface (UI) module 414.

The order handler 410 receives trade orders from the sellers. The orders can be processed in a queue (e.g., first in first out, etc.) or prioritized based on time horizons to complete the trade or other suitable metrics. The order handler 410 may also parse the trade order to identify the parameters, such as action (order to sell), equity name, number of shares, price, and so forth.

The execution strategy selector 412 ascertains the constituent values for certain parameters in the trade orders. The constituent values of interest pertain to the dimensions established by the multi-dimensional model 112. Continuing the above example of the cube 200 for equity trading, the selector 412 determines constituent values related to the liquidity, order size, and trade urgency of the trade order. The execution strategy selector 412 then compares these constituent values to a predetermined classification set established for the model 112. One example classification set is provided above in Table 1. Through this comparison, the trade orders are categorized within the cube 200. For each trade order, the execution strategy selector 412 selects an appropriate execution strategy from the library 114, where the selected strategy corresponds to the category of trade orders in the cube.

When the appropriate execution strategy is identified, the UI module 414 presents the execution strategy via graphical user interface (GUI) displayed on a trader screen, such as screen 420. The UI module 414 provides a layout that lists, for example, the trade order, its dimensions, the priority execution strategy identified by the strategy selection tool 110, and possible secondary strategies. In the example of FIG. 4, the trader screen 420 depicts a trade order number, the trade facts (e.g., 10,000 SH of ABC Corp.), and the dimension constituent values that form the criteria of the decision making tool (small-cap, 20% of ADV, 65 bps). The screen 420 also provides the preferred execution strategy for this set of values, which is broker-dealer capital.

Accordingly, for each trade order, the strategy selection tool 110 automatically identifies the trade execution strategies and presents them in a timely manner. The trader can then make quicker, more informed and cost-effective decisions when handling a large volume of trades.

Operation

Figure 5:
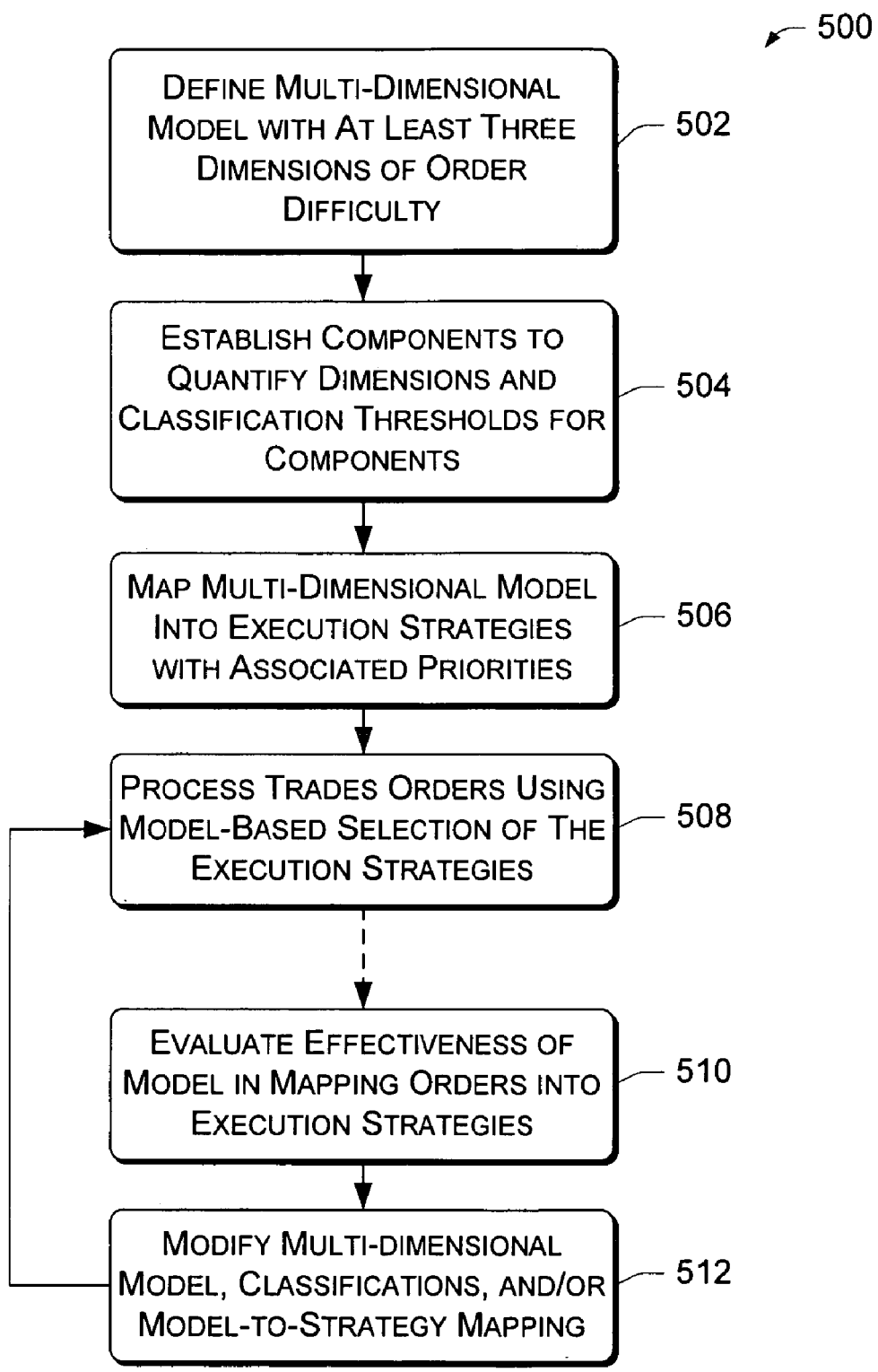
FIG. 5 is a flow diagram of a process for establishing and using a multi-dimensional model for selecting trade execution strategies.
Figure 6:
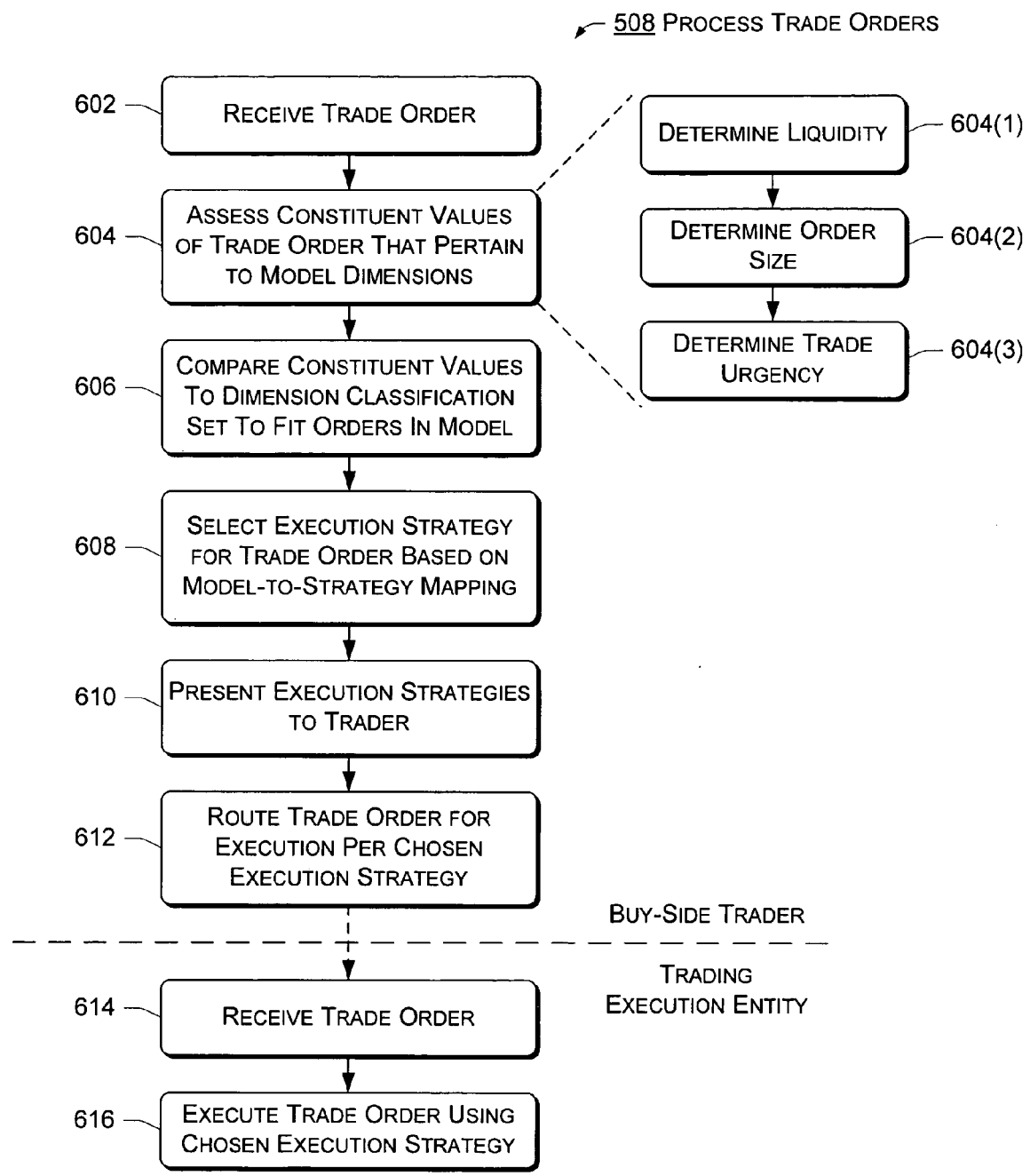
FIG. 6 is a flow diagram of one example implementation for handling trade orders using the multi-dimensional model.

FIGS. 5 and 6 illustrate computerized processes for model-based selection of trade execution strategies. Each of the processes is illustrated as a collection of blocks in a logical flow graph, which represent a sequence of operations that can be implemented, in whole or in part, in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The sequence in which the operations are described is not intended to be construed as a limitation, and any number of the described blocks can be combined and/or rearranged in other sequences to implement the process.

For discussion purposes, the processes are described with reference to the architecture, models, and system of FIGS. 1-4. It is noted, however, that the processes may be implemented in other architectures and systems, and employ other types of multi-dimensional models.

FIG. 5 shows a computerized process 500 for establishing and using a multi-dimensional model for selecting trade execution strategies. At 502, a multi-dimensional model having at least three dimensions is defined. Each dimension pertains to an attribute of a trade that reflects order difficulty. In the example described above for trading equities, the cube 200 defines three dimensions of order difficulty: liquidity, order size, and trade urgency. In other implementations, the model may include additional dimensions, or define different ones. For example, other dimensions for trading equities might include the market environment and complimentary strategies (e.g., is the trade part of an arbitrage strategy). Multi-dimensional models for trading other types of financial instruments might further employ entirely different trading dimensions.

At 504, one or more quantifiable components for each dimension in the model are established, along with a set of classification thresholds used to determine where the trade order fits in the model. As an example, for the order size dimension, trade orders may be quantified according to percentage of average daily volume (ADV). Quantifying trade orders for the trade urgency dimension may be accomplished by measuring trading alpha and/or volatility. A measure of market capitalization may be used to quantify trade orders for the liquidity dimension.

Once the dimensions are quantified, classification thresholds are set to provide discrete decision making points in the multi-dimensional model. One example set of classification thresholds for the cube 200 is provided above in Table 1. This classification set defines three distinct categories along each dimension, thereby establishing 27 discrete blocks throughout the cube 200. Trade orders can then be resolved to one of 27 discrete blocks depending upon the constituent values along the dimensions and how these values compare to the classification thresholds. For instance, trade orders for stocks with a market capitalization of more than $10 billion, having an order size of less than 0.25 percent of ADV and a trading alpha of less than 10 bps, resolve to the corner block 210 of cube 200. In contrast, trade orders for stocks with a market capitalization of less than $1 billion, having an order size of more than 15 percent of ADV and a trading alpha of more than 50 bps, resolve to a different block 212 of the cube 200.

At 506, the multi-dimensional model is mapped into execution strategies with associated priorities. Any number of execution strategies may be provided, and that number need not equate to the number of discrete blocks of the model. Moreover, trade orders that resolve to different blocks in the model may be mapped to the same execution strategy. FIG. 3 shows on example mapping, where eight corner blocks of the cube 200 are mapped into various execution strategies.

At 508, trade orders are processed using the model-based selection of the execution strategies. Trade orders are received, parsed into their constituent values, and applied against the classification set to resolve into a block of the cube. Once fitted to a block, the one or more execution strategies to which the block is mapped are selected and presented to the trader. One particular implementation of this operation is described below in more detail with reference to FIG. 6.

As the multi-dimensional model is used, its effectiveness at making timely and cost-effective decisions can be monitored. Accordingly, an optional set of operations can be performed (as represented by the dashed arrow continuing from block 508) to establish a control loop.

At 510, the effectiveness of the model for handling trade orders and selecting appropriate execution strategies is evaluated. Effectiveness may be measured, and hence evaluated, in any number of ways. If minimizing transaction costs is the objective, for example, the monitoring may involve ascertaining the costs associated with each trade execution and then evaluating whether the model chose the most cost-effective strategy for the given trade order. If reducing decision making time is a goal, the monitoring may involve detecting whether a trader's ability to handle more trades improves or worsens.

At 512, based on the evaluation, modifications may be made to the model (i.e., dimensions, components), or to the classification sets used to quantify the model dimensions, and/or to the model-to-strategy mapping. After modifications are made, the model is employed to handle future trade orders. The effectiveness may once again be measured, and further modifications made. This control cycle may be repeated multiple times to further refine the operation, or as management goals change.

FIG. 6 shows one example implementation of operation 508 (FIG. 5) for processing trade orders using the multi-dimensional model. The operation 508 is illustrated as having some actions performed at the buy-side trading system (e.g., system 108) and some actions being performed at a trade execution entity, such as ECNs 116 or broker platform 118 in FIG. 1. The actions performed at the buy-side trading system may be implemented, for example, by the strategy selection tool 110 executing on the servers of the trading system 108.

At 602, a trade order is received. As one example, the trade order is routed from a seller over a network and received at the trading system 108. The trade order is passed to the order handler module 410 which parses the order into various elements, such as equity name, number of shares, and so forth.

At 604, the constituent values for the trade order are assessed. Depending on the number of dimensions in the model, there may be three or more constituent values to assess. Thus, this operation may be composed as multiple sub-processes. In the case of the cube 200, assessing constituent values involves determining liquidity of the underlying equity at 604(1), determining the size of the trade order at 604(2), and determining trade urgency at 604(3). Act 604 may be performed, for example, by the strategy selection tool 110, and particularly, the execution strategy selector 412. In one implementation, the execution strategy selector 412 knows how to quantify each dimension and extracts the appropriate values from the trade order that pertain to that dimension. For determining liquidity, for example, the selector 412 understands that this dimension is quantified according to market capitalization, and hence ascertains from the trade order the market capitalization of the equity being traded.

At 606, the constituent values are compared to the classification set for the multiple dimensions to place the trade orders within the model. In the example classification set in Table 1 for cube 200, trade orders are resolved to one of the 27 discrete blocks depending upon how the constituent values compare to the classification set. For instance, trade orders for stocks with a market capitalization of more than $10 billion, having an order size of less than 0.25 percent of ADV and a trading alpha of less than 10 bps, resolve to one block 210 of cube 200. In contrast, trade orders for stocks with a market capitalization of less than $1 billion, having an order size of more than 15 percent of ADV and a trading alpha of more than 50 bps, resolve to a different block 212 of the cube 200.

At 608, the execution strategy for the trade order is selected according to the model-to-strategy mapping. Thus, if the trade order resolves to one location in the model (e.g., category block 210 of cube 200), the execution strategy in the library 114 to which that location in the model is mapped is selected as being the preferred strategy. One example model-to-strategy mapping for the cube 200 is provided in FIG. 3. Accordingly, for a trade order resolving to the block 210 in cube 200 (i.e., more liquidity, small orders, low urgency), the execution strategy selector 412 selects one of the possible strategies that include (1) DMA small-order algorithms, or (2) DMA limit orders to smart routers, ECNs, or broker platforms. Many other mappings are possible depending upon the management goals.

At 610, the selected execution strategies are presented to the trader. The execution strategies may be presented, for example, via a graphical UI depicted on the trader's computer screen, such as that illustrated in FIG. 4. This allows the trader to consider the offered selections, and render a final decision on how the trade order will ultimately be executed.

At 612, the trade order is routed for execution according to the strategy chosen by the trader. The trade order may be routed, for example, to ECNs, brokers, a trading algorithm, or any other mechanism to execute the trade.

In the event that the trade is routed to another entity, at 614, the trade order is received at the trading entity for execution according to the strategy selected using a multi-dimensional model. At 616, the trade order is executed by the trading entity according to the strategy.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor-implemented method, comprising:
providing a multi-dimensional model having at least three dimensions, each dimension pertaining to order difficulty of a trade order;
mapping, by a processor, the multi-dimensional model into multiple execution strategies such that different execution strategies are associated with different levels of order difficulty;
assessing, by the processor, the order difficulty of a trade order; and
selecting, based on the assessed order difficulty, at least one of the execution strategies to execute the trade order.

2. A method as recited in claim 1, wherein the dimensions comprise order size, liquidity, and trade urgency.

3. A method as recited in claim 1, wherein one of the dimensions comprises trade urgency, and said assessing the order difficulty comprises determining the trade urgency of the trades.

4. A method as recited in claim 3, wherein said determining the trade urgency comprises evaluating trading alpha.

5. A method as recited in claim 3, wherein said determining the trade urgency comprises evaluating volatility.

6. A method as recited in claim 3, wherein said determining the trade urgency comprises evaluating execution risk.

7. A method as recited in claim 1, further comprising evaluating effectiveness of the multi-dimensional model in mapping trades into the execution strategies and making modifications to improve effectiveness.

8. One or more computer-readable media storing computer-executable instructions that, when executed on one or more processing units, perform the method recited in claim 1.

9. A computer-implemented method, comprising:
receiving multiple trade orders to trade equities; and
automatically selecting, by a computer, execution strategies for the trade orders using a multi-dimensional model that maps trade orders to execution strategies according to liquidity, order size, and trade urgency; and
executing the trade orders according to the selected execution strategies.

10. A computer-implemented method as recited in claim 9, wherein the liquidity is quantified according to one of (1) market capitalization, (2) market exchange, (3) timing, and (4) occurrence of irregular events.

11. A computer-implemented method as recited in claim 9, wherein the order size is quantified according to one of (1) number of shares, (2) function of volume traded, (3) market capitalization, (4) sector type, and (5) market exchange.

12. A computer-implemented method as recited in claim 9, wherein the trade urgency is quantified according to one of (1) trading alpha, (2) volatility, and (3) execution risk.

13. A computer-implemented method as recited in claim 9, wherein the trade urgency is quantified according to trading alpha, further comprising:
characterizing trading alpha ranges over a predetermined period of time; and
evaluating the trading alpha of the trade orders.

14. A computer-implemented method as recited in claim 9, further comprising presenting the execution strategies thus selected for consideration by a trader.

15. One or more computer-readable media storing computer-executable instructions that, when executed on one or more processing units, perform the computer-implemented method recited in claim 9.

16. A processor-implemented method, comprising:
receiving a trade order for execution according to a particular strategy, the strategy being selected, by a processor, using a multi-dimensional model that maps trade orders to execution strategies according to at least three dimensions of order difficulty; and
executing the trade order according to the particular strategy.

17. A method as recited in claim 16, wherein the dimensions comprise order size, liquidity, and trade urgency.

18. A system comprising:
a processor; and
a memory disposed in communication with the processor and storing processor-issuable instructions that:
means for receiving trade orders to trade equities; and
provides a multi-dimensional model having at least three dimensions, each dimension pertaining to order difficulty of a trade order;
maps the multi-dimensional model into multiple execution strategies such that different execution strategies are associated with different levels of order difficulty;
assesses the order difficulty of a trade order; and
selects, based on the assessed order difficulty, at least one of the execution strategies to execute the trade order.

19. A system as recited in claim 18, wherein the dimensions comprise the trade urgency, liquidity of the equities, and order size.

20. A system as recited in claim 18, further comprising:
present the execution strategies for consideration by a trader.

* * * * *